T. F. LEVENS.
Steering Propellers.
No. 199,985. Patented Feb. 5, 1878.
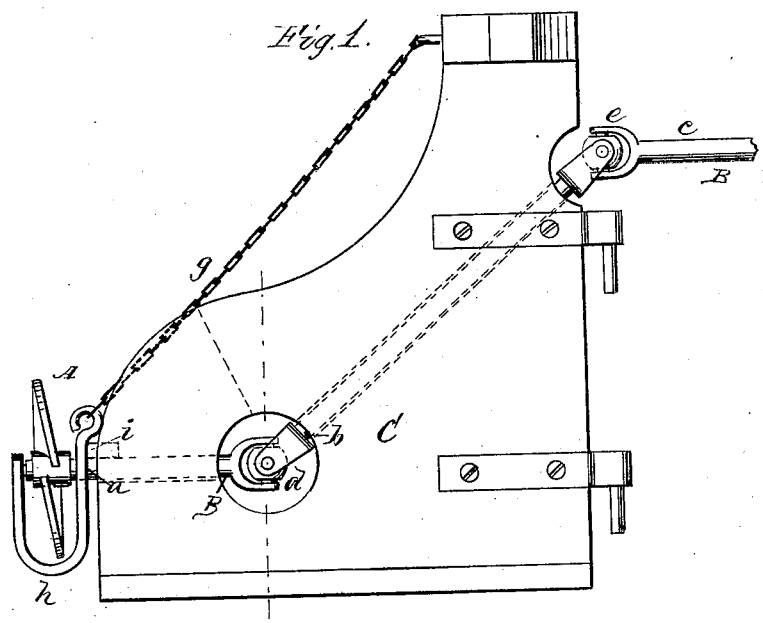
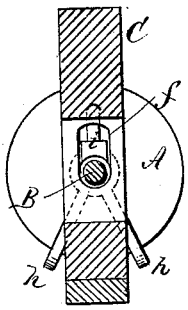
WITNESSES:
E. Wolff
J. H. Scarborough
INVENTOR:
T. F. Levens.
BY Munn & Co
ATTORNEYS.

UNITED STATES PATENT OFFICE.

TURNER F. LEVENS, OF CASCADES, WASHINGTON TERRITORY.

IMPROVEMENT IN STEERING-PROPELLERS.

Specification forming part of Letters Patent No. 199,985, dated February 5, 1878; application filed June 25, 1877.

*To all whom it may concern:*

Be it known that I, TURNER F. LEVENS, of Cascades, Skamania county, Washington Territory, have invented a new and Improved Propeller, of which the following is a specification:

Figure 1 is a side elevation of my improved propeller; and Fig. 2 is a vertical section on line $x\ x$, Fig. 1.

Similar letters of reference indicate corresponding parts.

My invention consists in the combining of a screw-propeller with the rudder of a boat, and connecting it with any convenient power by a shaft having universal joints, which permits of moving the screw with the rudder.

In the drawing, A is a screw of ordinary construction, that is secured to a shaft, B, which is divided into the sections $a\ b\ c$, and connected together by universal joints $d\ e$. The section $a$ of the shaft B revolves in a slot, $f$, in the rudder C, and is capable of being raised up in the said slot by means of the chain $g$, that is attached to a U-shaped guard, $h$. This guard is placed on the shaft, between the screw A and rudder C, and extends under the screw, and upward to receive the end of the shaft. The lower part of this guard is split and separated a small distance, to more perfectly protect the wheel. It is provided with a lug, $i$, above the shaft, which projects into the slot in the rudder, and prevents the guard from turning.

It is obvious that as the screw swings with the rudder its propulsive force will be exerted in the most effective manner.

When the screw is not used it is raised up out of the water by drawing the chain $g$.

The guard $h$ prevents the screw from clogging or coming into contact with the bottom or banks when used in shallow water.

Having thus described my invention, I claim as new and desire to secure by Letters Patent—

The combination, with screw A, of a shaft in sections, $a\ b\ c$, connected by joints $d\ e$, the slotted rudder C, and the guard $h$, having lug $i$, as and for the purpose specified.

TURNER F. LEVENS.

Witnesses:
J. F. ATTWELL,
J. E. ANDREWS, Sen.